United States Patent [19]

Schiffman

[11] 4,207,440
[45] Jun. 10, 1980

[54] DICTATION RECORDER WITH SPEECH-EXTENDABLE ADJUSTMENT PREDETERMINED PLAYBACK TIME

[75] Inventor: Murray M. Schiffman, Westport, Conn.

[73] Assignee: The VSC Company, Westport, Conn.

[21] Appl. No.: 907,494

[22] Filed: May 19, 1978

Related U.S. Application Data

[63] Continuation of Ser. No. 654,022, Jan. 30, 1976, abandoned.

[51] Int. Cl.$^2$ ............................................. G11B 19/02
[52] U.S. Cl. ................................................ 179/100.1 VC
[58] Field of Search ................. 179/100.1 VC, 1 VC, 179/100.1 DR; 360/74, 71, 74.4; 340/148

[56] References Cited

U.S. PATENT DOCUMENTS

| | | | |
|---|---|---|---|
| 2,410,835 | 11/1946 | Montague | 179/100.1 VC |
| 3,402,266 | 9/1968 | Winther | 179/100.1 VC |
| 3,532,835 | 10/1970 | Nakayama et al. | 179/100.1 VC |
| 3,614,336 | 10/1971 | Patey | 179/100.1 VC |
| 3,723,667 | 3/1973 | Park, Jr. | 179/100.1 VC |
| 3,786,195 | 1/1974 | Schiffman | 179/15.55 T |
| 4,000,517 | 12/1976 | Brickerd | 179/100.1 VC |

FOREIGN PATENT DOCUMENTS

| | | | |
|---|---|---|---|
| 776657 | 6/1957 | United Kingdom | 179/100.1 VC |
| 842832 | 7/1960 | United Kingdom | 179/100.1 VC |

*Primary Examiner*—Raymond F. Cardillo, Jr.
*Attorney, Agent, or Firm*—Charles E. Pfund

[57] ABSTRACT

An audio reproducer has a start-stop motor controlled by a timer in which the run-time and off-time for the motor can be each independently selected with the onset at off-time modified by a pause detector which is responsive to the interval between word groups corresponding to a normal pause in human speech. Thus in transcribing dictated material a secretary can set a suitable ratio between run-time and off-time in order to be able to type the reproduced words according to her own preference and the pause detector will modify the selected ratio of on and off time to assure that the dictation is not interrupted until a normal pause occurs in the sequence of words.

5 Claims, 2 Drawing Figures

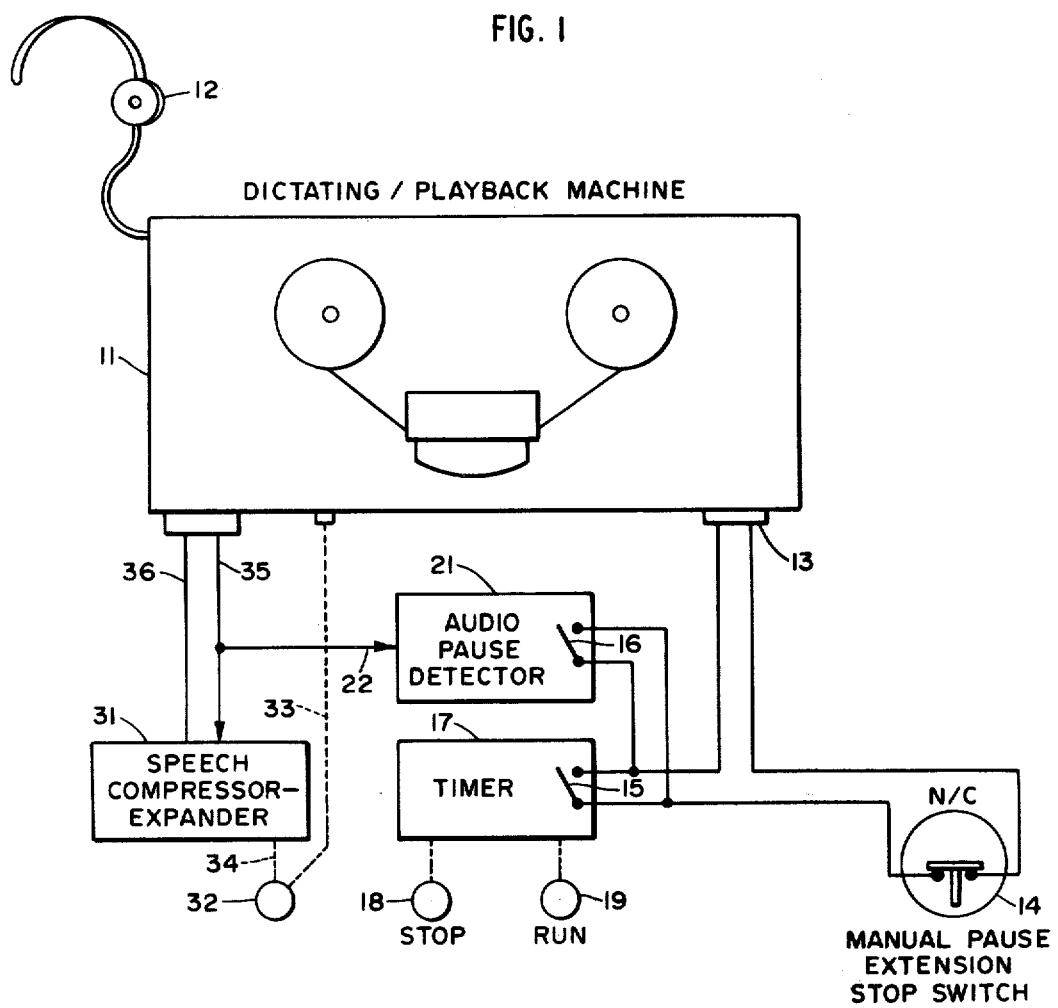
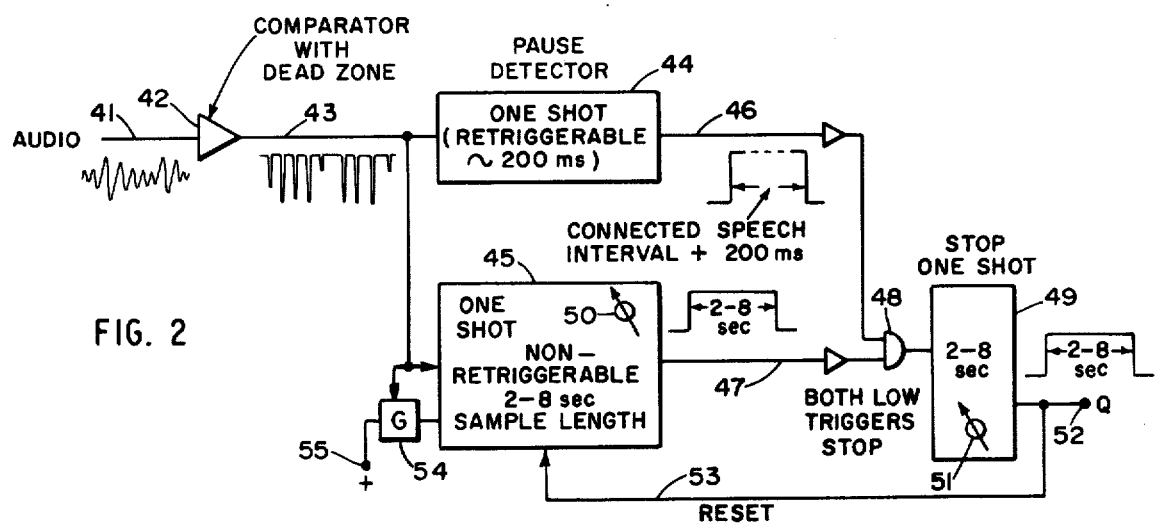

DICTATION RECORDER WITH SPEECH-EXTENDABLE ADJUSTMENT PREDETERMINED PLAYBACK TIME

This is a continuation of application Ser. No. 654,022 filed Jan. 30, 1976, now abandoned.

BACKGROUND OF THE INVENTION

This invention relates generally to audio reproducers for recorded material and more particularly to such reproducers as are used by stenographers for transcribing the word message into typewritten or similar form. In such systems it is well known that the record is reproduced in a start-stop fashion normally by manual (foot switch) control to enable the typist to listen to a word grouping and type the words prior to listening to the next word grouping. Use of a manually controlled switch while typing necessitates an intermittent typing and listening sequence which is coordinated both with respect to performing the typing and controlling the playback device such that a high degree of skill is required for high speed transcription and the attention required generally results in fatigue for the operator after the process has been sustained for a period of time.

SUMMARY OF THE INVENTION

It is the principal object of the present invention to provide an automatic timer for controlling a playback device used for reproducing a dictated message for transcription with suitable controls for adapting the reproduction rate to the individual needs of the transcriber. It is a further object to avoid the interruption of words or word groupings during automatic control of the playback of a recording for transcription. It is a further object to provide control for the playback of a record reproducing device which permits selection of the on-off time ratio and control of the interruption of words and word groupings to permit reproduction at a natural rate that allows a typist to transcribe on a substantially continuous basis.

These and other objects of the invention will become clear from the detailed description taken in conjunction with the accompanying drawing.

DESCRIPTION OF THE DRAWING

FIG. 1 is a block diagram of the invention shown in conjunction with a related device for speech compression or expansion.

FIG. 2 is a logic diagram of a modification of the system shown in FIG. 1.

DETAILED DESCRIPTION OF THE PREFERRED EMBODIMENT

Referring now to FIG. 1, a dictating playback machine 11 is shown which may be of the type which reproduces a message recorded on a magnetic tape either of the open reel or cassette type. The device 11 will ordinarily supply an audible output to a head set 12 used by the typist and the reproduction of the recorded message will be subject to a start-stop control 13 which operates to enable and disable a drive for the record medium. Thus the start-stop control could be an electrical input for the drive motor or for control of a drive capstan to engage and disengage the tape medium. Ordinarily, the start-stop control for driving the record medium which is applied at input 13 is derived from a foot control switch for an office dictating machine.

In accordance with the present invention the switch input to terminals 13 comprises a series circuit consisting of a normally closed switch 14, a timer switch 15 which is paralleled by normally open contacts 16. The normally closed switch 14 provides for manual stop for the playback device 11, (a conventional play-stop and replay switch may also be provided). The circuit to input 13 is completed when switch 14 is in its normally closed position and either one or both of switches 15 or 16 is closed.

Switch terminals 15 are controlled by a timer device 17 which has two manual adjustments 18 and 19. The selective control 18 determines an interval of time for the timer 17 to maintain the contacts 15 in open circuit condition. The manual adjustment 19 permits selection of an interval controlled by timer 17 during which the contacts 15 will be maintained in closed circuit condition. Thus with switch 14 normally closed and the adjustments 18 and 19 selected for timer 17 the circuit for start-stop control of the audible reproducer 11 will involve a run-time determined by the selected position of control 19 during which contacts 15 are in closed circuit condition and the interval so determined will be interrupted by periods during which contacts 15 are in open circuit condition which period is established by the adjustment of control 18. Thus the reproducer 11 will ordinarily run and stop with a predetermined on and off ratio with the actual on period and off period established by the controls 19 and 18 respectively.

The ratio established by controls 18 and 19 is modified by a pause detector circuit 21 which is coupled on line 22 to sense the audio signal in the reproducer 11 derived from the record medium. Thus there will always be audio input on line 22 to the pause detector 21 whenever the tape recorder 11 is running with a recorded message on the tape. The pause detector 21 responds to the audio signal level on line 22 to close contacts 16. Contacts 16 open whenever the audio level present on line 22 falls below a certain level for a predetermined interval. By controlling the time constant of this circuit to correspond to the normal pause interval between word groupings in normal speech, the contacts 16 can be controlled so as not to open in the middle of a word grouping. Since the pauses within words are less than the pauses between word groupings the contacts 16 will not open for pauses in the middle of a word. Thus when the on interval established by control 19 for timer 17 ends and the pause interval established by control 18 is to be initiated by opening contacts 15, the parallel closed circuit established by contacts 16 will maintain the tape recorder 11 running until the next pause in the word grouping is detected by absence of the minimum interval of the signal on line 22. Thus the audio reproduction of the word grouping will be completed before the tape drive is stopped. The remainder of the pause period set by control 18 will elapse before the playback drive is started at the end of the pause period. At that time contacts 15 close for the pre-set run interval and the sequence repeats. If this sequence makes the overall pause or stop interval too short for the typist a simple remedy can be effected by increasing the pause period by adjustment of control 18 or shortening the run period by adjustment of control 19.

The foregoing description of the invention can be used with any record reproducer having a controllable start-stop feature. Further features and advantages can be realized where the invention is used in conjunction with a speech compression-expansion device 31 which may, for example, be of the type disclosed in U.S. Pat. No. 3,786,195. Such devices by means of a coordinated control 32 for the tape drive speed applied on line 33 and frequency conversion on line 34 to establish the desired frequency transformation in the device 31, permit the tape recording to be played back at any desired speed with the frequency spectrum of the audio output restored to the normal speech spectrum. For this purpose the audio channel of the reproducer 11 is passed via line 35 from the unit 11 to the unit 31 and after frequency transformation via line 36 from the unit 31 to the unit 11 and eventually to the audio output in headset 12. With this added feature the typist can not only control the reproduction on-off time ratio without interruption of word groupings but can select the speed of reproduction to be higher or lower than normal as the typist's typing speed is greater or less than the normal speaking speed of the one who dictated the message permits. Furthermore, after the transcription is complete the tape can be replayed at high speed, such as twice the normal rate, with pitch correction by the speech compressor 31 to permit proof-reading at much higher than normal speech rates but with the normal speech frequencies restored by the unit 31. It may also be an aid to comprehension to listen at high burst speeds which are comprehensible by virtue of the frequency or pitch correction provided by the unit 31 and set a suitably long pause introduced by control adjustment 18 to permit typing of the relatively long voiced word sequence. This arrangement would roughly correspond to speed reading where a large amount of information is absorbed at high rate and only the pause necessary to transcribe the message into typed form is interspersed as required by the typist's typing speed.

Referring now to FIG. 2, a logic diagram implementing the system of the invention using monostable or one-shot multivibrators will be described with a further modification providing additional features. The audio signal derived from the moving tape is applied on line 41 to a dead zone comparator 42. The dead zone comparator 42 produces no output for plus and minus signals below a certain absolute amplitude threshold but for signals greater than either the plus or minus threshold produces an output of a series of pulses representing the speech signal amplitudes in excess of the threshold values. This pulse signal output appears on line 43 and is applied to a retriggerable one-shot 44 and to a non-retriggerable one-shot 45. The one-shot 44 is triggered by the pulse signals on line 43 to remain in one state and upon the loss of the pulse signal inputs from line 43 the one-shot 44 remains in that state for a predetermined time and then returns to an opposite state. Typically, the time interval of the one-shot 44 is approximately 200 ms such that its output will fall 200 ms after the cessation of the input signals on line 43.

The one-shot 45 has an adjustable pulse length provided by control 50 such that after it is triggered by the appearance of the pulse signal on line 43 which is applied to the input of one-shot 45 its output in one state is maintained for a selected interval between approximately two to eight seconds corresponding to the sample length of speech desired. At the end of the preset interval the one-shot 45 returns to its quiescent state and its output falls.

The output on line 46 of one-shot 44 and the output on line 47 of one-shot 45 are applied to an AND gate 48 such that when both outputs on lines 46 and 47 have fallen an output of gate 48 is applied to a stop one-shot 49. The stop one-shot 49 can be adjusted by control 51 to provide an output pulse of predetermined duration, for example, a range of two to eight seconds, after which the one-shot 49 returns to its quiescent state. The output pulse appearing on line 52 is applied to control the tape drive and stop the reproduction running of the tape during the interval of the output pulse from one-shot 49. The pulse on line 52 is also applied as a reset pulse to one-shot 45 conditioning it to be able to be triggered by the next voice signal on line 43.

The operation of the logic circuit of FIG. 2 will now be described. Assuming the tape drive is running and that audio signals appear on line 41 the comparator 42 produces pulses on line 43 during intervals when the speech signal is of adequate magnitude. A further function of the comparator 42 is to eliminate signals on its output line 43 due to tape noise. Upon the occurrence of pulses on line 43 the one-shot 45 is triggered and starts its timing cycle of approximately two to eight seconds. The repetition of speech pulses on line 43 continuously retriggers one-shot 44 such that its output stays high as long as speech signals are present. At the end of the timing interval of one-shot 45 its output 47 goes low and one-shot 44 in effect detects the next following pause in the speech signal. Thus the next absence of speech signals on line 43 for a period of approximately 200 ms causes the output 46 of one-shot 44 to fall. With both outputs 46 and 47 low the gate 48 applies a signal to trigger one-shot 49 thereby stopping the tape drive with the pulse signal on line 52 which may be of two to eight seconds duration. With the tape stopped, of course, audio signals on line 41 and pulses on line 43 disappear. When the pulse on line 52 falls the reset signal on line 53 resets one-shot 45 so that it will respond to the next occurring speech pulse signals on line 43. Since the end of the pulse output on line 52 also starts the tape drive reappearance of audio signals on line 41 will occur following any additional pause time, to produce the pulse signals on line 43, and, since one-shot 45 has been reset the sequence is repeated. Thus the tape runs for the period of any additional pause time plus two to eight seconds set by one-shot 45 plus the further interval required to reach a pause in the audio signal as determined by one-shot 44 and after that pause is detected at the end of the two to eight second interval the tape drive is turned off for the interval determined by one-shot 49. By adjustment of controls 50 and 51 the length of the run and stop intervals can be selected to suit the typing speed of the typist.

A modification of the circuit of FIG. 2 can be added to extend the run interval when the message content contains substantial gaps or quiet periods. For this condition the typist can generally remember the content of a longer play-back interval since the space between words reduces the overall information required to be remembered until the message can be retyped. For this purpose a switching gate 54 has as its input a positive potential by which the timing capacitor of one-shot 45 is charged and the control input thereof is provided by the pulses on line 43. With this additional circuit the timing of one-shot 45 after it has been triggered will be extended since the timing capacitor only charges during the presence of negative-going word pulses from line 43. During the positive-going pulse plus pause intervals between said negative-going word pulses the gate 54 prevents the timing capacitor of one-shot 45 from accumulating charge and thus extends the one-shot interval accordingly. Thus for a pause-interspersed message a correspondingly greater run time is automatically provided by the one-shot 45. Otherwise, the operation of the circuit of FIG. 2 remains the same.

Various modifications will now be apparent to those skilled in the art for minor changes or modifications to achieve the objectives of the invention and, accordingly, the invention is not to be considered as limited to the specific arrangement shown.

I claim:

1. A dictation rate controlled record reproducer comprising:

means for operating said record reproducer to obtain a speech signal from the record medium;

signal responsive means for stopping operation of said record reproducer for a predetermined stop period;

means for sensing the presence of said speech signal derived from operation of said record reproducer;

means responsive to the initial sensing of said speech signal for providing a signal for a time corresponding to a predetermined minimum run-time interval;

said responsive means being manually adjustable to provide said predetermined run-time interval;

means responsive to absence of said speech signal for providing a pause detection period signal to extend a predetermined time beyond the absence of said speech signal;

means responsive to the absence of both said signal during said predetermined time and said predetermined run interval signal for producing a stop signal for a predetermined time; and means for applying said stop signal to said signal responsive means for stopping operation of said record reproducer for said predetermined stop period;

said means for operating said record reproducer being responsive to the absence of said stop signal to provide speech signals from said medium.

2. Apparatus according to claim 1 and including means for selecting the reproduction speed of said reproducer to be different than the recording speed for said record.

3. A dictation reproducer comprising:

a record playback reproducer for providing an audio signal, said reproducer having a start-stop motor control;

timing means for operating said motor control including further means to provide manually adjustable predetermined run-time and means to provide manually adjustable alternate predetermined off-time periods for said motor;

a signal detector responsive to the audio signal above a predetermined threshold amplitude being reproduced by said record playback reproducer to provide a detected audio signal at its output, a pause detector responsive to said signal detector output signal for providing at said pause detector output a first signal in response to the absence of said detected audio signal for a predetermined interval exceeding the pause between spoken word groups;

said means to provide predetermined off-time periods responsive to a signal from said run-time means during said run-time period and responsive to said first signal of said pause detector output, said off-time period means providing a signal to said motor control for running said motor and extending the run-time of said motor beyond the predetermined run-time until said pause detector provides said first signal to said off-time period means after said predetermined run-time period signal terminates;

said off-time period means output signal provided to said motor control stopping said motor for a predetermined off-time period at the conclusion of said extended run-time and causing said motor to run at the end of said off-time period, and said off-time period means output signal being provided to said run-time means to reset said run-time means to provide said run-time period signal at the end of said off-time period.

4. Apparatus according to claim 3 wherein said predetermined run-time means is responsive to the signal detector output for intitiating said predetermined run-time period in response to the initial sensing of said speech signal by said signal detector after being reset by said off-time period means output signal at the end of said off-time period.

5. Apparatus according to claim 3 and including means for selecting the reproduction speed of said reproducer to be different than the recording speed for said record.

* * * * *